(12) United States Patent
Tarasinski et al.

(10) Patent No.: US 8,167,104 B2
(45) Date of Patent: May 1, 2012

(54) GEAR SHIFTING POINT FOR THE ESTABLISHMENT OF A CONNECTION, FIXED AGAINST ROTATION, BETWEEN A GEAR AND A SHAFT

(75) Inventors: Nicolai Tarasinski, Frankenthal (DE); Rainer Gugel, Mannheim (DE)

(73) Assignee: Deere & Company, Moline, IL (US)

( * ) Notice: Subject to any disclaimer, the term of this patent is extended or adjusted under 35 U.S.C. 154(b) by 851 days.

(21) Appl. No.: 11/991,126

(22) PCT Filed: Aug. 7, 2006

(86) PCT No.: PCT/EP2006/065123
§ 371 (c)(1),
(2), (4) Date: Feb. 27, 2008

(87) PCT Pub. No.: WO2007/025845
PCT Pub. Date: Mar. 8, 2007

(65) Prior Publication Data
US 2009/0133981 A1    May 28, 2009

(30) Foreign Application Priority Data

Aug. 27, 2005  (DE) .......................... 10 2005 040 633

(51) Int. Cl.
*F16D 27/09*  (2006.01)
*F16D 23/04*  (2006.01)
(52) U.S. Cl. .................. 192/48.2; 192/48.91; 192/53.2; 192/84.92; 192/84.951; 74/339; 74/365
(58) Field of Classification Search ................. 192/48.2, 192/53.2, 84.92, 84.951; 74/365
See application file for complete search history.

(56) References Cited

U.S. PATENT DOCUMENTS
721,678 A * 3/1903 Douglas .................... 192/84.21
(Continued)

FOREIGN PATENT DOCUMENTS
DE   1068519    11/1959
DE   1131521    6/1962
DE   10119748   10/2001
(Continued)

OTHER PUBLICATIONS
PCT Search Report, Feb. 1, 2007, 9 Pages.

*Primary Examiner* — Richard M. Lorence (57) ABSTRACT

The invention relates to a gear shifting point (10) for producing a rotationally fixed connection between a toothed wheel (16, 18) and a shaft (12). Said gear shifting point (10) comprises a shaft (12), a sliding sleeve (24) and at least one toothed wheel (16, 18). The toothed wheel (16, 18) is mounted rotationally with respect to the shaft (12). The sliding sleeve (24) is mounted on the shaft (12) in such a way that it is not rotatable therewith. The toothed wheel (16, 18) and the sliding sleeve (24) are embodied in such a way that a rotationally fixed connection can be produced therebetween in the coupled state of the gear shifting point (10) and no connection can be produced between the toothed wheel (16, 18) and the sliding sleeve (24) in the neutral state of the gear shifting point (10). The aim of said invention is to develop and improve the gear shifting point (10) which is used for producing a rotationally fixed connection between the toothed wheel (16, 18) and the shaft (12), is cost effective and operates in as interference-free manner as possible. For this purpose, the inventive gear shifting point (10) is characterized in that the sliding sleeve (24) is provided with at least one electromagnet (38, 40) and the coupled state of the gear shifting point (10) is obtainable by activating said electromagnet (38, 40).

13 Claims, 5 Drawing Sheets

U.S. PATENT DOCUMENTS

| | | | | |
|---|---|---|---|---|
| 821,024 | A | * | 5/1906 | Damon ..................... 192/84.21 |
| 2,306,643 | A | * | 12/1942 | Sewell ........................ 192/53.2 |
| 2,940,570 | A | * | 6/1960 | Thielmann .................. 192/53.2 |
| 2,969,134 | A | | 1/1961 | Wiedmann et al. |
| 3,203,279 | A | * | 8/1965 | Rahrig et al. ................. 474/73 |

FOREIGN PATENT DOCUMENTS

| | | |
|---|---|---|
| DE | 102005039263 | 2/2007 |
| EP | 1298362 | 2/2003 |
| EP | 1298363 | 2/2003 |
| FR | 2583489 | 12/1986 |

* cited by examiner

GEAR SHIFTING POINT FOR THE ESTABLISHMENT OF A CONNECTION, FIXED AGAINST ROTATION, BETWEEN A GEAR AND A SHAFT

The invention concerns a gear shifting apparatus for the establishment of a connection, fixed against rotation, between a gear and a shaft of a gearbox. The gear shifting apparatus includes a shaft, a shift sleeve and at least one gear. The at least one gear is supported in bearings, free to rotate, relative to the shaft, for example, by means of a rolling contact bearing or needle bearing, provided between the gear and the shaft or sliding on the shaft. The shift sleeve is supported in bearings on the shaft, fixed against rotation. The gear and the shift sleeve are configured in such a way that a connection, fixed against rotation, can be established between the gear and the shift sleeve in a shifted condition of the gear shifting apparatus and that no connection, fixed against rotation, can be established between the gear and the shift sleeve in a neutral condition of the gear shifting apparatus.

Gear shifting apparatus of the kind cited initially are known from the state of the art, they are applied in particular for the shifting of gearbox gear ratios in motor vehicles. A gear shifting apparatus operating on a purely mechanical basis is applied, for example, to the power take-off shaft of a tractor of the applicant. Here an essentially linear motion of a mechanical linkage or of a push-pull control is converted into the rotational movement of a shift shaft on which a cam disk is arranged, fixed against rotation. Corresponding grooves are provided in the cam disk into each of which the journal of a shift fork extends. If the shift shaft is rotated along with the cam disk then the interaction of the journal with the groove produces a movement of the shift fork in its general direction. Thereby the shift fork together with a corresponding shift sleeve can be brought from a neutral condition to a shifted condition in order to establish a connection, fixed against rotation, between a shaft and a gear. This power take-off shaft gearbox is a non-synchronized gear shifting apparatus.

Reference is made purely as an example to DE 101 19 748 A1 in which the required energy for the actuation of a shift fork of a gear shifting apparatus is provided by the rotational energy of a drive motor. Moreover pneumatically or hydraulically actuated gear shifting apparatus are known with which a linear movement of a shift fork can be generated directly in order to perform the shift process. Actuators operating on an electromagnetic basis are also known, for example, from EP 1 298 362 A2 and EP 1 298 363 A2. In these electromagnetic actuators permanent magnets are applied.

All of the arrangements for the actuation of a gear shifting apparatus have one thing in common, that is, the complex mechanical configuration that requires many individual components. Thereby the gear shifting apparatus, on the one hand, are costly and expensive to manufacture and, on the other hand, prone to malfunction.

Therefore the purpose of the present invention is to define a gear shifting apparatus of the kind cited initially and to develop it further, through which the aforementioned problems are overcome. In particular a gear shifting apparatus is to be defined for the production of a connection, fixed against rotation, between a gear and a shaft, that is cost effective and which operates as far as possible without malfunctions.

The purpose of the invention is fulfilled according to the invention by the teaching of patent claim 1. Further advantageous embodiments and further developments of the invention follow from the subordinate claims.

According to the invention a gear shifting apparatus of the kind cited initially is characterized by the shift sleeve that is provided with at least one electromagnet and that upon an activation of the electromagnet a shifted condition of the gear shifting apparatus can be established.

In other words the relative motion between the gear and the shift sleeve is produced by the electromagnetic principle and should be attributed to the application of current to the electromagnet of the shift sleeve. When the electromagnet is activated, the electromagnet establishes a magnetic field. This magnetic field extends through the air gap or between the shift sleeve and the gear and develops a force that attracts the shift sleeve to the gear or that attracts the gear to the shift sleeve, so that the gear and the shift sleeve are engaged with each other, whereby a connection, fixed against rotation, is established between the gear and the shaft. Fundamentally the gear shifting apparatus could also be configured in such a way that the magnetic field of the electromagnet produces a repelling force between the gear and the shift sleeve, particularly if one of the components is configured, at least in part, as a permanent magnet and that the magnetic field of the permanent magnet is oriented in the opposite direction to the magnetic field of the electromagnet.

A shift sleeve in the sense of the present invention, therefore, in particular is a component that established a connection, fixed against rotation, between the shaft and a gear. On the one hand the shift sleeve can be attached to the shaft, fixed against rotation, and locked in place, and a gear—a loose gear—can move in the direction of the shift sleeve, in order to establish a connection, fixed against rotation, between the gear and the shift sleeve. On the other hand the shift sleeve can be arranged fixed against rotation so it is attached to the shaft but can be slid in the longitudinal direction of the shaft in order to move the gear—a loose gear—that is arranged on the shift sleeve so as to establish a connection, fixed against rotation, between the gear and the shift sleeve.

Therefore the change of gear ratio or a shift for the shift of a gear shifting apparatus it is necessary only to turn a current on or off. With the use of this principle, in a very particularly useful way, a multitude of individual mechanical components can also be omitted, since the electromagnet directly brings about a relative movement between the gear and the shift sleeve. Due to the method of operation, according to the invention, a very particularly significant simplification of a gear shifting apparatus operating on an electromagnetic basis can be achieved. Thereby the guidance device for the armature can be omitted as it was required for the electromagnetic actuator according to EP 1 298 362 A1 and EP 1 298 363 A2 on the one hand, and on the other hand also a shift fork arranged on the shift sleeve of the gear shifting apparatus. Since the gear shifting apparatus does not require a shift fork, this component can, in other words, be saved. Hence the gear shifting apparatus, according to the invention, can be manufactured more cost effectively and operates more reliably and less prone to malfunctions, since the gear shifting apparatus includes fewer parts or components.

The shift sleeve is generally configured in the shape of a ring or a torus. The shaft extends through the shift sleeve. In a very particularly preferred embodiment the at least one electromagnet if integrated into the shift sleeve. Thereby a very compact configuration can be achieved to very particularly great advantage, which makes possible a compact configuration even in gearboxes with a large number of gears or a large number of gear ratios and hence a total of very many gear shifting points. Moreover the integration of the magnet into the shift sleeve permits a greater efficiency in the operation of the gear shifting apparatus, according to the invention, since the magnetic field generated by the electromagnet operates so as to attract or repel the gear directly. The configuration of the gear shifting apparatus with few components, according to the invention, permits a short shift time of the gear shifting point which can be achieved in a very particularly advantageous way. Accordingly it is appropriate to configure the at least one electromagnet in the general form of a ring, so that it conforms in general to the shape of the shift sleeve.

In actual fact the electromagnet could be provided with a coil and a core. A current supply arrangement is provided with which the electromagnet or the coil of the electromagnet can be supplied with current. The current supply arrangement could be provided with at least one clip ring that is attached to or arranged in the form of an external ring located in a central region relative to the longitudinal extent. Alternatively the current supply arrangement could be configured in the form of an electromagnetic clutch or an electromagnetic brake in which the magnetic field is transmitted across an air gap that is held to a narrow width from a stationary coil element to the rotating elements. A current transmission arrangement without a slip ring would also be conceivable on the principle of a transformer, where then the shaft is used as a yoke.

Fundamentally a gear and the shift sleeve are configured in such a way that a positive lock connection or a friction lock connection can be obtained between a gear and the shift sleeve, where a positive lock connection between the gear and the shift sleeve is preferred.

A positive lock connection could be provided, for example, by the gear being provided with a set of gear teeth in the radial or the axial direction and that the shift sleeve is provided with a generally complementary set of gear teeth—in the radial or the axial direction as well. The preferred provision is for the gear to have a set of gear teeth in the axial direction, that is, in the longitudinal direction of the shaft of the gearbox. Thereby only a few additional sets of gear teeth are required in order to configure a gear shifting apparatus according to the invention with respect to these. Thereby the required shift paths can be held to a smaller value compared to a set of gear teeth in the radial direction, since the tips of the gear teeth in axial sets of gear teeth represent the carrying teeth that carry the torque. In the case of a set of radial gear teeth the points of the teeth are merely a device for the engagement of the teeth to each other and the carrying, torque transmitting sets of gear teeth require additional process steps.

As a function of the characteristics to be attained by the gear shifting apparatus the set of gear teeth are configured are deviating, straight or undercut. A deviating set of gear teeth will be selected if the gear shifting apparatus is brought from a shifted condition to a neutral condition more or less automatically in case the electromagnet is deactivated and no attraction force exists any longer between the shift sleeve and the corresponding gear, since then the form of the set of gear teeth brings about a deviation of the shift sleeve from the gear. A straight set of gear teeth or an undercut set of gear teeth will be selected if the gear shifting apparatus is to be brought from the shifted condition into the neutral condition with additional measures, for example, if the gear shifting apparatus assumes a neutral condition on the basis of a spring preload or if the connection, fixed against rotation, between gear and shift sleeve is released under the effect of a corresponding force, for example, by activating an additional electromagnet that is arranged and controlled in a corresponding manner.

According to a preferred embodiment at least one force device is provided under the effect of whose force a neutral condition can be attained between a gear and the shift sleeve of the gear shifting point. The force device displays this effect particularly when the electromagnet is deactivated. The force device could, for example, be a spring arrangement or a spring, that force the gear and the shift sleeve into a condition in which they are spaced apart.

Fundamentally the gear shifting apparatus could be provided with only one gear or with two gears. In case that the gear shifting apparatus is provided with a gear and a shift sleeve with an electromagnet, the gear is arranged adjacent to the electromagnet. Then the electromagnet is activated, a relative movement between the gear and the electromagnet can be brought about, in order to bring the gear and the shift sleeve into an engaged condition.

In case that the gear shifting apparatus is provided with two gears and a shift sleeve with two electromagnets—particularly arranged spaced apart axially—then the shift sleeve is arranged together with the two electromagnets between the two gears. Each gear is arranged adjacent to an electromagnet. When an electromagnet is activated a relative movement can be brought about between the gear arranged adjacent to the activated electromagnet and the electromagnet itself, in order to bring the gear and the shift sleeve into an engaged condition.

According to a very particularly preferred embodiment a gear or an electromagnet is provided with at least one synchronizing element with which a friction lock condition can be established between the gear and the shift sleeve when the electromagnet is activated in order to bring the gear to a rotational speed that essentially corresponds to the rotational speed of the shift sleeve or the shaft. Thereby a synchronized gear shifting point can be made available since the synchronizing element brings about a braking/accelerating effect between the shift sleeve, rotating with the shaft, and the gear, that may be stationary under certain circumstances when a friction lock connection exists between the gear and the shift sleeve. In this synchronizing step the electromagnet is supplied with an electric current of predetermined current density that is determined in such a way that the magnetic field generated by the electromagnet is sufficiently strong to provide an adequate force to the synchronizing element to produce a friction lock connection. Usually this current density is not sufficient to bring the gear shifting apparatus into a shifted condition. This would require that a greater current density flow through the electromagnet.

The synchronizing element could be arranged so as to move relative to the gear in the longitudinal direction of the shaft. The synchronizing element could be configured generally in the form of a ring or a cylinder, or it could be arranged in a recess in the form of a ring or a cylinder in the gear or the electromagnet.

In order to keep the wear of the synchronizing element or the contact surface of the synchronizing element as low as possible and/or so that the synchronizing process is performed as efficiently as possible, the electromagnet and/or the shift sleeve could be provided with a friction coating on the surface facing the synchronizing element on which the synchronizing element comes into contact during the synchronizing process. Thereby an automatic equalization of wear is also attained to particularly great advantage. In case that the friction coating is worn away over time by the synchronizing process this is equalized by means of the synchronizing element which is moved over a path that is increased by the amount of the wear.

The following describes a gear shifting apparatus in which the at least one gear is attached so as to be able to slide in the longitudinal direction of the shaft and in which the shift sleeve is arranged so as to be immobilized. Correspondingly the gear is forced or moved against the shift sleeve by the magnetic field when the electromagnet is activated whereby a connection, fixed against rotation, is established between the gear and the shift sleeve and hence the gear shifting apparatus is in the shifted condition. Hence the shifted condition of the gear shifting apparatus corresponds to an activated condition of the electromagnet.

In case the electromagnet is deactivated, the gear shifting apparatus is in the neutral condition, that is, there is no connection, fixed against rotation, between the gear and the shift sleeve. To avoid an engagement between the gear and the shift sleeve in the neutral condition the preferred solution is to provide a force device between the shift sleeve and the gear in the form of a spring, that forces the gear away from the shift sleeve.

A gear shifting apparatus alternative to the above can be configured, according to the invention, in such a way that the at least one gear is arranged or supported in bearings generally in the same position in the longitudinal direction of the shaft. The shift sleeve is arranged so that it can be moved along with the at least one electromagnet in the longitudinal direction of the shaft. Correspondingly, the shift sleeve moves towards the gear upon an activation of an electromagnet on the basis of the magnetic attractive force so that the gear shifting apparatus is thereby brought into a shifted condition and a connection, fixed against rotation, is established between the gear and the shift sleeve and thereby with the shaft. The gear could, for example, be retained in position by contact with a disk where the disk is held by a snap ring on the shaft.

In this gear shifting apparatus a force device is also provided, that preferably includes a spring, which now forces the shift sleeve into a position spaced away from the gear. In actual fact the force device could be configured in such a way that the shaft is provided with at least one recess extending in the radial direction, for example, in the form of a blind hole. A spring is provided in the recess. A ball is provided between the spring and the shift sleeve. The shift sleeve is provided with at least one recess facing the ball in such a way that the shift sleeve can be forced, on the basis of the spring force into a position spaced away from the gear. The recess on the side of the shift sleeve facing the ball could, in particular, be configured inclined, in the form of a ramp, or V-shaped and extending in the longitudinal direction of the shaft. On the basis of the spring force the ball is forced in radial direction out of the recess in the shaft outward and into the recess of a shift sleeve. The recess in the shift sleeve is configured and positioned in such a way that the spring and the ball engage furthest in the radial direction in to the recess of a shift sleeve in the neutral condition of the gear shifting apparatus. As soon as an electromagnet is activated the shift sleeve is moved on the basis of the magnetic attractive force in the direction of the gear that is adjacent to the electromagnet. Thereby the ball with the spring is moved inward in radial direction into the recess in the shaft due to the inclined or ramp shape of the recess. Hence it is the force of the force device or of the spring that must be overcome in order to move the shift sleeve out of the neutral position. When the gear shifting apparatus is in the shifted condition and the electromagnet is deactivated the shift sleeve and thereby the gear shifting apparatus is brought into the neutral position on the basis of the force of the force device.

In a very particularly preferred embodiment the gear shifting apparatus, according to the invention, is controlled by means of a control arrangement or by means of a process for the control of a gear shifting apparatus according to one of the claims of DE 10 2005 039 263 which at the time of this patent application had not been published. In the following reference is made to the control arrangement or the process for the control of the gear shifting apparatus from DE 10 2005 039 263. Therefore the entire contents of the disclosure of this patent application is incorporated herein.

Hence in case that the gear shifting apparatus is equipped with a synchronizing element, then the coil of the electromagnet is supplied with a current of predetermined first current density in order to activate the synchronizing element. This first current density is determined in such a way that, on the one hand, the synchronizing element achieves the aforementioned braking or synchronizing effect, but on the other hand, a shift process of the gear shifting apparatus is not performed thereby.

If now the gear shifting apparatus is to be brought into a shifted condition immediately after the synchronizing process or even without the synchronizing process, then the coil of the electromagnet is supplied with an electric current of a predetermined second current density. This second current density is greater than the first current density, it is determined in such a way that the shift process of the gear shifting apparatus is performed with the highest possible likelihood of success—if necessary against the force of a force device that may be provided.

To shift the gear shifting apparatus into the shifted condition the coil of the electromagnet is supplied with an electric current of a predetermined third current density, where the third current density is smaller then the second current density. The at least one gear consists of a ferromagnetic material and is attracted into the magnetic field of the electromagnet of the shift sleeve. Since in the shifted condition of the gear shifting apparatus the gear is arranged closer to the electromagnet, it is also sufficient to retain the gear in the shifted condition with the electric current of the third current density in the coil of the electromagnet, since with a closer spacing of the gear from the electromagnet (that is, with a small air gap or nearly no air gap at all) the magnetic field nevertheless is sufficiently strong to (due to a reciprocal relationship of the strength of the magnetic field to the local coordinate as a function of the spacing from the electromagnet) Although the retaining current required for this is merely a fraction—such as $\frac{1}{5}$ or $\frac{1}{6}$—of the electric current of the second current density that is used to move the gear.

In order to bring the gear shifting apparatus into the neutral condition, the coil of the electromagnet is not supplied with electric current. Hence the gear shifting apparatus is brought into its neutral condition simply by interrupting the current flow through the electromagnet—for example, on the basis of a deflecting set of gear teeth or on the basis of the force of the force device. Finally this may also have technical safety advantages, for upon a power outage the gear shifting apparatus according to the invention is automatically brought into the neutral condition. The activation of another electromagnet could also bring the gear shifting apparatus from a shifted condition into the neutral condition.

Although the entire contents of the disclosure of DE 10 2005 039 263 is incorporated herein, it should be noted very particularly that the current that is supplied to the at least one electromagnet may be pulsed or may be pulse width modulated to particularly great advantage. Thereby, to particularly great advantage, the energy requirement for retaining the gear shifting apparatus in the shifted condition is very low.

There are now various possibilities of organizing and further developing the teaching of the present invention to great advantage. For this purpose reference is made, on the one hand, to the patent claims subordinate to patent claim 1, and, on the other hand, to the following explanation of the preferred embodiment on the basis of the drawing. In general preferred embodiments of the teaching of the invention are explained in connection with the explanation of the preferred embodiment of the invention on the basis of the drawing. The drawings show in each case schematic illustrations of FIG. 1 shows a cross sectional view of a first embodiment of a gear shifting apparatus according to the invention in a neutral condition.

The identical or similar components or groups of components are identified in the drawings by the same part number call-outs.

Figure 1:
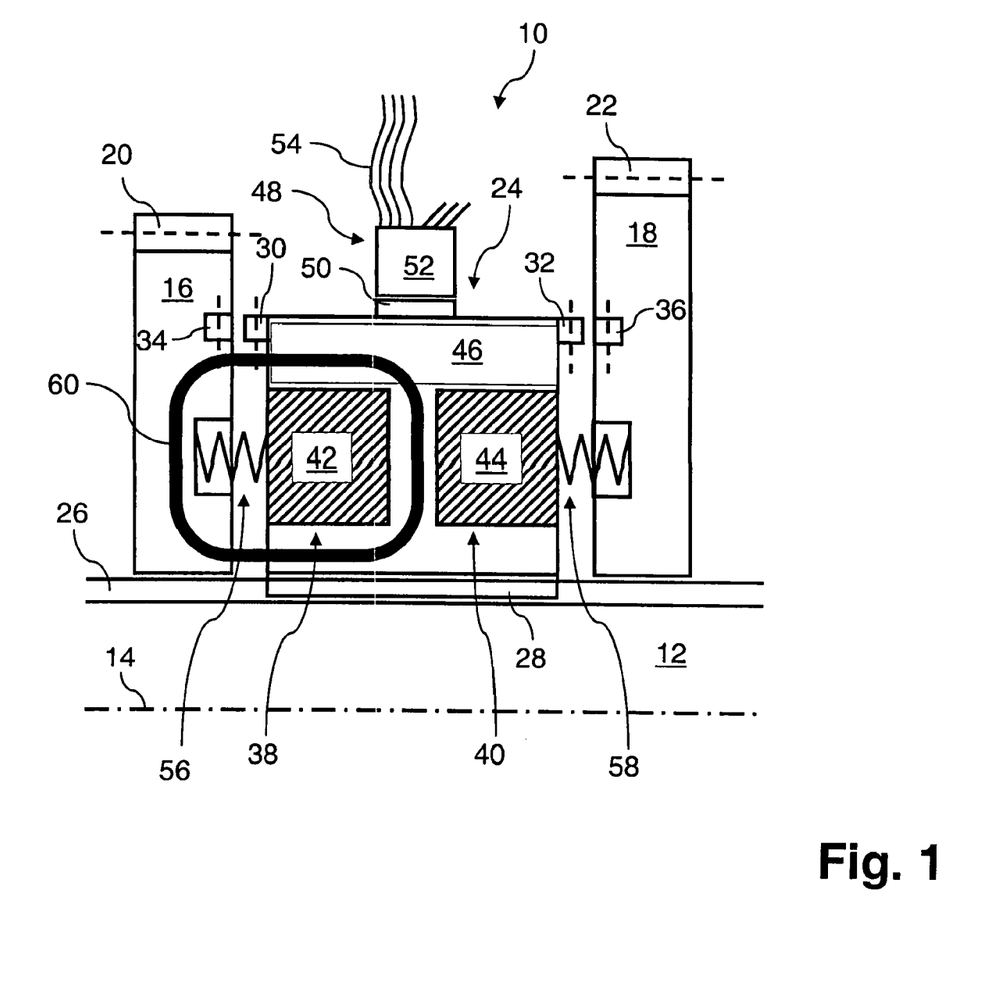

FIG. 1 shows a gear shifting apparatus 10 according to the invention. The gear shifting apparatus 10 includes a shaft 12, that is supported in bearings, free to rotate, about its longitudinal axis 14, where the bearing locations of the shaft 12 are not shown in FIG. 1. Moreover the gear shifting apparatus includes two gears 16, 18, that are supported in bearings free to rotate relative to the shaft 12. The gears 16, 18 are configured as loose gears, that is, they are arranged so that they can be slid in the longitudinal direction along the shaft 12. Each of the gears 16, 18 is provided with a set of running gear teeth 20, 22 that mesh with another gear, not shown in FIG. 1.

Furthermore the gear shifting apparatus 10 is provided with a shift sleeve 24 that is immobilized on the shaft 12, that is, it is arranged so that it cannot be shifted in the longitudinal direction. The shaft 12 is provided with a set of external gear teeth 26 that mesh with a set of internal gear teeth 28 of the shift sleeve 24 so that a connection, fixed against rotation, is also formed between the shift sleeve 24 and the shaft 12. The shift sleeve 24 is provided with a set of gear teeth 30, 32 that extend outward in the axial direction and can mesh with a complementary set of gear teeth 34, 36 that extend inward in the gears 16, 18. In the embodiment according to FIG. 1, the sets of gear teeth 30 through 36 are straight, that is, they are neither deflective nor undercut. Thereby a positive lock connection can be established between the shift sleeve 24 and each of the gears 16, 18.

According to the invention the shift sleeve 24 is provided with an electromagnet 38, 40 for each gear 16, 18. Each of the electromagnets 38, 40 is provided with a coil 42, 44 which are wound on a common core 46 that consists of a material (soft iron) that amplifies the magnetic field of the coils 42, 44. The electromagnets 38, 40 are generally configured in the form of a ring, and thereby conform generally to the shape of the shift sleeve 24. Hence the electromagnets 38, 40 are integrated into the shift sleeve 24.

The current supply arrangement 48 is provided for the current supply to the coils 42, 44 of the electromagnets 38, 40 and is configured in the form of a slip ring where one component 50 is provided and immobilized, and fixed against rotation, to the shift sleeve 24 and another component 52 of the slip ring is immobilized at the gearbox housing, not shown in FIG. 1. The current supply cables 54 provide an electric connection between an electric current source, not shown in FIG. 1 and the coils 42, 44 of the electromagnets 38, 40.

A force device is provided between the gear 16 and the shift sleeve 24 or between the gear 18 and the shift sleeve 24, it is configured in the form of a spring 56, 58. The springs 56, 58 can force each of the gears 16, 18 into a position spaced away from the shift sleeve 24, so that the teeth of the gears 30 through 36 do not mesh. This condition of the gear shifting apparatus 10 corresponds to the neutral position, therefore there is no connection, fixed against rotation, between the gear 16 and the shift sleeve 24 nor between the gear 18 and the shift sleeve 24.

The part number call out 60 identifies a line of the magnetic field of the electromagnet 38 where the magnetic field of the electromagnet 38 is developed when an electric current is applied to the coil 42. Thereby the gear 16 is attracted to the shift sleeve 24 on the basis of the magnetic field of the electromagnet 38 until the gear 16 comes into planar contact with the shift sleeve 24 or the core 46 of the electromagnet 38, so that the sets of external gear teeth 30 of the shift sleeve 24 mesh with the sets of internal gear teeth 34 of the gear 16. This condition is shown in FIG. 2, where here the shifted condition of the gear shifting apparatus 10 exists with regard to the gear 16 and the shift sleeve 24.

Figure 2:
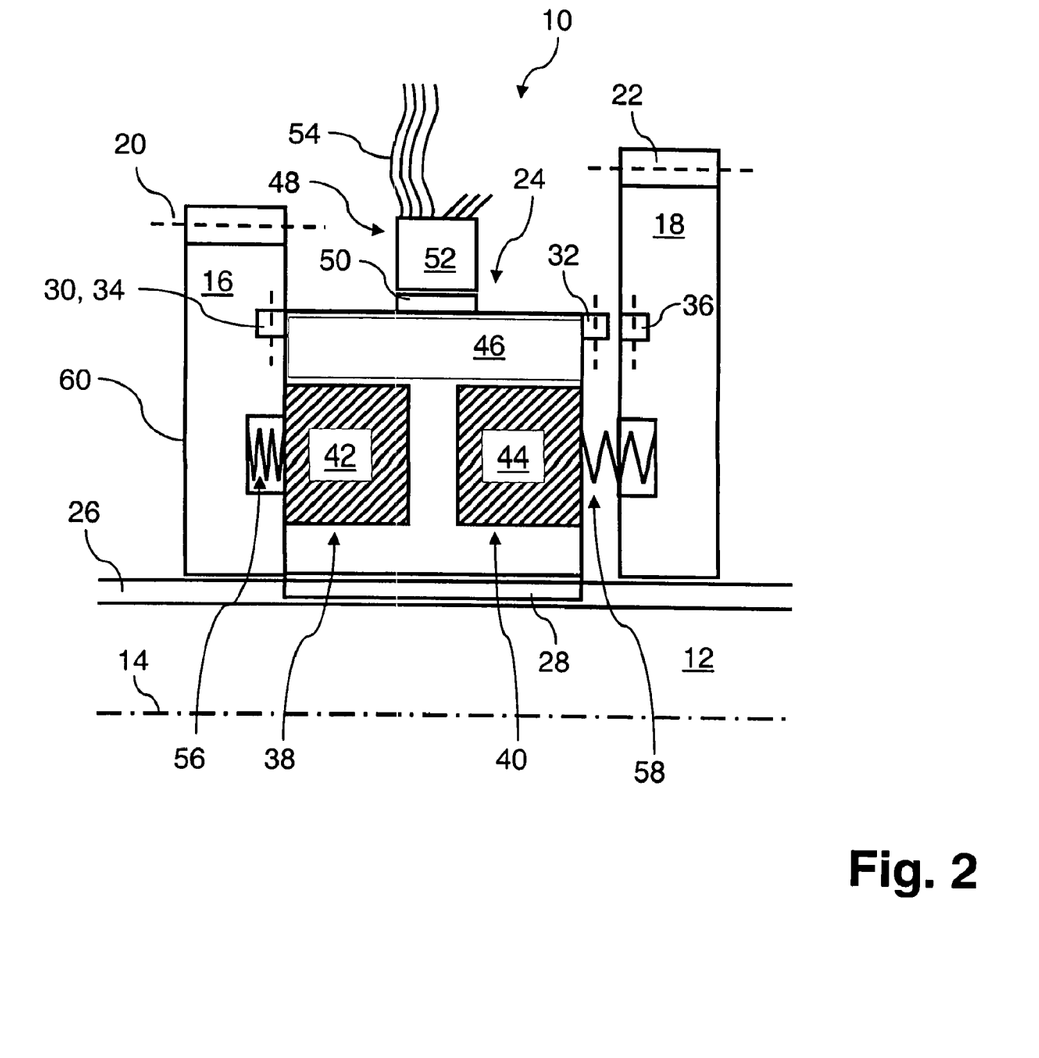
FIG. 2 shows a cross sectional view of the embodiment according to FIG. 1 in a shifted condition.

It should be noted very particularly that the gear shifting apparatus 10, shown in FIGS. 1 and 2, the shaft 12, only one gear 16, as well as the left part of the shift sleeve 24 could be provided with an electromagnet 38 for a current supply arrangement. Such a gear shifting apparatus 10 is provided with only two shift conditions, that is, a neutral condition and a shifted condition of the gear 16. On the other hand, the gear shifting apparatus 10 shown in FIGS. 1 and 2 is provided with three different shift conditions, that is, the neutral condition shown in FIG. 1 in which neither the gear 16 nor the gear 18 is connected, fixed against rotation, with the shift sleeve 24 as well as the first shifted condition of the gear 16—shown in FIG. 2—and the second shifted condition of the gear 18, not shown in FIGS. 1 and 2.

Figure 3:
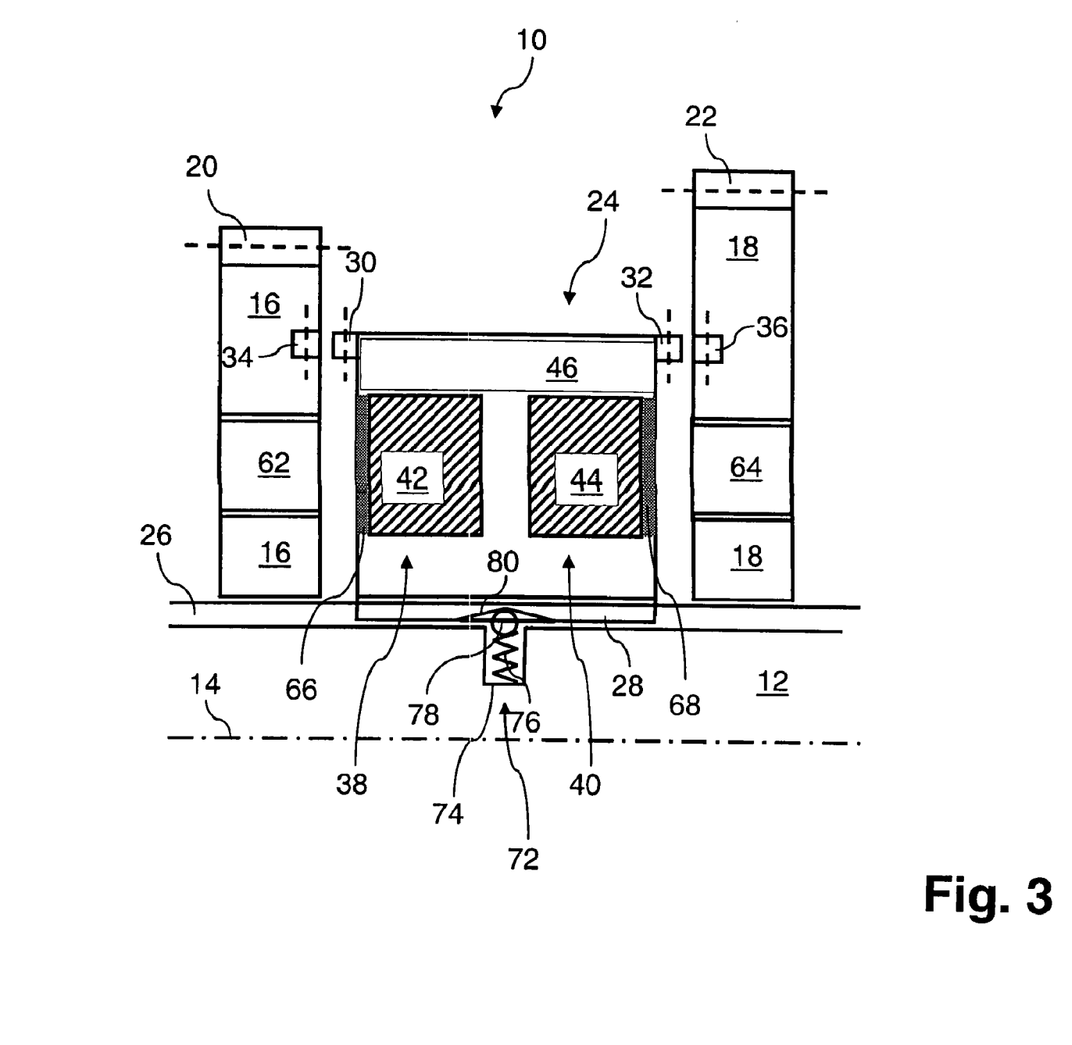
FIG. 3 shows a cross sectional view of a second embodiment of a gear shifting apparatus in a neutral condition.
Figure 4:
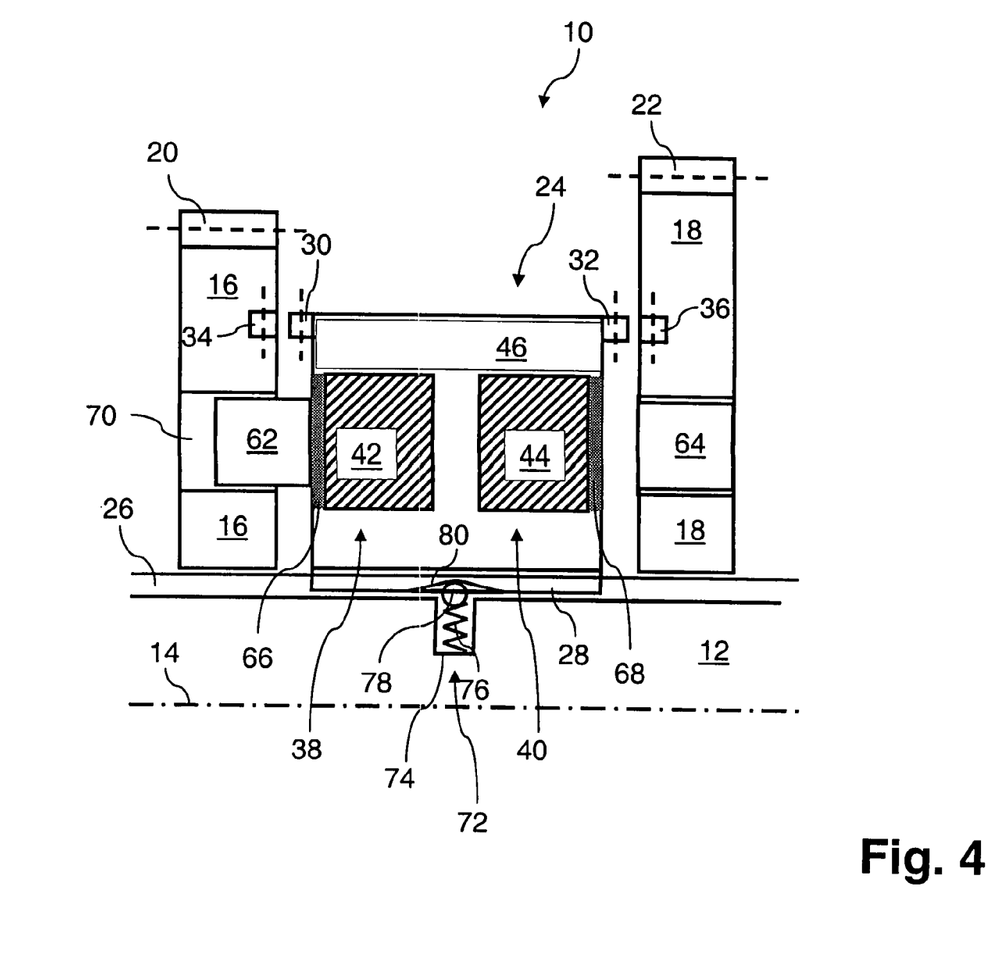
FIG. 4 shows a cross sectional view of the embodiment of FIG. 3 in a synchronizing condition.
Figure 5:
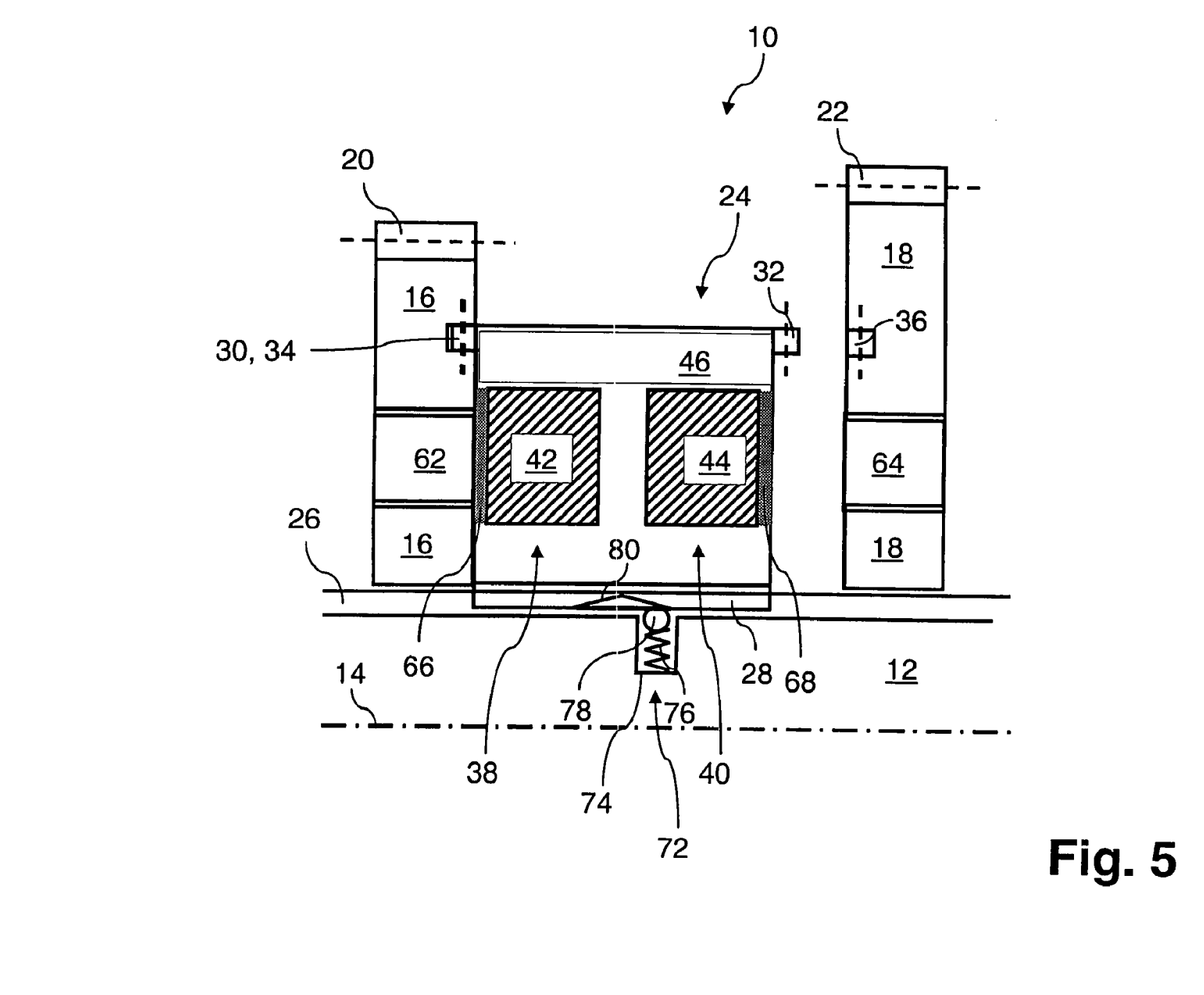
FIG. 5 shows a cross sectional view of the embodiment of FIGS. 3 and 4 in a shifted condition.

FIGS. 3 through 5 show an alternative embodiment of a gear shifting apparatus 10 according to the invention. In this gear shifting apparatus 10 the gears 16, 18 are also arranged, free to rotate, relative to the shaft 12, but in such a way that they cannot be shifted in the longitudinal direction relative to the shaft 12. Rather the shift sleeve 24 of this gear shifting apparatus 10 is arranged so that it can be slid along the longitudinal direction of the shaft 12. Each gear 16, 18 is provided with a synchronizing element 62, 64 that consists of metal—as are the gears 16, 18—and are attracted to the activated electromagnets 38, 40.

FIG. 4 shows the gear shifting apparatus 10 in a condition in which the electromagnet 38 is activated in such a way that the synchronizing element 62 is attracted on the basis of the magnetic field. In this condition the synchronizing element 62 comes into contact with the friction coating 66. The electromagnet 40 is provided with a friction coating 68 with which the synchronizing element 64 comes into contact, in case the electromagnet 40 is activated for synchronizing. By means of the synchronizing process the rotational speed of the gear 16, 18, that may not be rotating, can be brought to a rotational speed that corresponds to the rotational speed of the shift sleeve 24 which rotates with the shaft 12. This illustration makes it clear that the synchronizing element 62, generally configured in a cylindrical shape, is arranged in a cylindrical recess 70 in the gear 16. It should be noted that the shift sleeve 24 of the gear shifting apparatus 10, as shown in FIG. 4, is still in the neutral condition, as is shown in FIG. 1.

Finally FIG. 5 shows the gear shifting apparatus 10 in a condition in which the electromagnet 38 is activated or has been activated in such a way that the shift sleeve 24 is attracted to the gear 16 on the basis of the magnetic field generated by the electromagnet 38, particularly in such a way that the shift sleeve 24 or the electromagnet 38 essentially comes into planar contact with the gear 16. Correspondingly the sets of gear teeth 30 of the shift sleeve 24 mesh with the sets of gear teeth 34 of the gear 16 and a connection, fixed against rotation, is established between the shift sleeve 24 and the gear 16. Since a connection, fixed against rotation, has been established between the shaft 12 and the shift sleeve 24 on the basis of the sets of gear teeth 26, 28, a connection, fixed against rotation, is therefore established between the shaft 12 and the gear 16. This corresponds to the shifted condition of the gear 16 of the gear shifting apparatus 10 of FIGS. 3 through 5.

The force device 72 of the gear shifting apparatus 10 of FIGS. 3 through 5 is configured as follows: the shaft 12 is provided with a recess in the radial direction in the form of a blind hole 74. A spring 76 is arranged in the blind hole 74, it forces the ball 78 outward in the radial direction into the recess 80 of the shift sleeve 24. The recess 80 of the shift sleeve 24 is positioned or configured in such a way that the shift sleeve 24 is forced into the neutral position of the gear shifting apparatus 10—that is shown in FIGS. 3 and 4. In case that the magnetic attractive force is strong enough that the shift sleeve 24 is attracted to one of the gears 16, 18 then the ball 78 is forced inward in the radial direction against the spring force of the spring 76 on the basis of the inclined configuration of the recess 80. In case the electromagnet 38 or 40 is deactivated, that is, there is no attractive force between the shift sleeve 24 and one of the gears 16 or 18, then the spring 76 forces the ball 78 outward in the radial direction into the recess 80 in the shift sleeve 24, whereby the shift sleeve 24 is again brought into its central neutral position on the basis of the inclined configuration of the recess 80, as is shown in FIGS. 3 and 4.

The components shown in FIGS. 1 through 5 are arranged in a gearbox housing not shown in the figures. Obviously the components of the gears 16, 18, the shift sleeve 24, together with electromagnets 38, 40 as well as the external gearset 26 of the shaft 12 should be shown in a mirror image on the axis 14 which, however has not been done in the figures in the present case. Accordingly the shaft 12 extends through the gears 16, 18 but is not always connected, fixed against rotation, with these.

Following this it should be noted very particularly that the embodiments explained above are used solely to describe the teaching claimed, but do not limit these to the embodiments shown.

The invention claimed is:

1. A gear shifting apparatus for the establishment of a positive locking connection between a gear and a shaft, comprising a shaft, a shift sleeve with at least one electromagnet, the shift sleeve being connected to the shaft, and at least one gear, where the at least one gear is supported in bearings, free to rotate relative to the shaft, where the shift sleeve is fixed against rotation on the shaft, and where the gear and the shift sleeve are configured in such a way that a positive locking connection can be established in a shifted condition of the gear shifting apparatus between the gear and the shift sleeve and that in a neutral condition of the gear shifting apparatus no positive locking connection is established between the gear and the shift sleeve, wherein one of the shift sleeve and the at least one electromagnet interacts with at least one synchronizing element with which a frictional locking connection between the at least one gear and the shift sleeve is established upon activation of the at least one electromagnet in order to bring the at least one gear to a rotational speed substantially equal to the rotational speed of the shift sleeve before establishing the positive locking connection, wherein the at least one synchronizing element is arranged so that it is moved in the longitudinal direction of the shaft relative to the gear, the synchronizing element being configured in the shape of one of a ring and a cylinder and being arranged in a recess of one of the gear and the electromagnet, the recess being in the shape of one of a ring and a cylinder.

2. A gear shifting apparatus according to claim 1, wherein the at least one electromagnet is integrated into the shift sleeve.

3. A gear shifting apparatus according to claim 1, wherein the at least one electromagnet is configured in a ring shape.

4. A gear shifting apparatus according to claim 1, wherein the electromagnet is provided with a coil and a core, and a current supply arrangement is provided with which the coil of the electromagnet is supplied with current and the current supply arrangement is provided with at least one slip ring.

5. A gear shifting apparatus according to claim 1, wherein the gear is provided with a set of gear teeth that extend in one of a radial and an axial direction and the shift sleeve is provided with a set of gear teeth that is generally complementary to the set of gear teeth of the gear and also extend in one of an axial and radial direction.

6. A gear shifting apparatus according to claim 5, wherein the sets of gear teeth are configured as one of deflective, straight and under cut.

7. A gear shifting apparatus according to claim 1, wherein at least one force device is provided, under the influence of whose force a neutral condition is established between a gear and the shift sleeve of the gear shifting apparatus when the electromagnet is deactivated.

8. A gear shifting apparatus according to claim 1, wherein the gear is arranged adjacent to the electromagnet and upon an activation of the electromagnet a relative movement is brought about between the gear and the electromagnet, in order to bring the gear and the shift sleeve into an engaged condition.

9. A gear shifting apparatus according to claim 1, comprising two gears and a shift sleeve with two electromagnets spaced apart from each other in the axial direction the shift sleeve being arranged between the two gears and each of the two gears being arranged adjacent to an electromagnet and upon an activation of an electromagnet a relative movement is brought about between the gear arranged adjacent to the electromagnet and the activated electromagnet, in order to bring the gear and the shift sleeve into an engaged condition.

10. A gear shifting apparatus according to claim 1, wherein one of the electromagnet and the shift sleeve is provided with a friction coating arranged facing the synchronizing element to which the synchronizing element comes into contact during the synchronizing process.

11. A gear shifting apparatus according to claim 1, wherein the at least one gear is supported in the bearings, in the longitudinal direction of the shaft generally in the same position, and the shift sleeve is moved together with the at least one electromagnet in the longitudinal direction of the shaft.

12. A gear shifting apparatus according to claim 11, wherein a force device is provided with a spring which forces the shift sleeve into a position spaced away from the gear.

13. A gear shifting apparatus according to claim 11, wherein the shaft is provided with at least one recess extending in the radial direction, a spring is provided in the recess, a ball is provided between the spring and the shift sleeve, and the shift sleeve is provided with at least one recess facing the ball, extending in the longitudinal direction of the shaft at one of an angle and a V-shape in such a way that the shift sleeve is forced into a position spaced away from the gear on the basis of the spring force.

* * * * *